United States Patent [19]
Bendall

[11] Patent Number: 5,600,440
[45] Date of Patent: Feb. 4, 1997

[54] LIQUID CRYSTAL INTERFEROMETER

[75] Inventor: Charles S. Bendall, La Mesa, Calif.

[73] Assignee: The United States of America as represented by the Secretary of the Navy, Washington, D.C.

[21] Appl. No.: 498,070

[22] Filed: Jul. 5, 1995

[51] Int. Cl.$^6$ ..................................................... G01B 9/02
[52] U.S. Cl. ........................................... 356/345; 356/361
[58] Field of Search .................................... 356/345, 346, 356/361; 359/78

[56] References Cited

U.S. PATENT DOCUMENTS

| | | |
|---|---|---|
| 4,072,422 | 2/1978 | Tanaka et al. . |
| 4,190,366 | 2/1980 | Doyle ........................................ 356/346 |
| 4,594,002 | 6/1986 | McNally . |
| 4,627,731 | 12/1986 | Waters et al. ............................ 356/345 |
| 4,681,445 | 7/1987 | Perkins . |
| 4,725,141 | 2/1988 | Georgiou et al. ....................... 356/345 |
| 4,750,834 | 6/1988 | Fateley . |
| 4,905,169 | 2/1990 | Buican et al. . |
| 4,948,253 | 8/1990 | Biegen . |
| 5,034,603 | 7/1991 | Wilson .................................... 356/345 |
| 5,150,236 | 9/1992 | Patel ........................................ 356/346 |
| 5,184,233 | 2/1993 | Lim et al. ................................. 359/46 |
| 5,452,127 | 9/1995 | Wagner ................................... 356/352 |

Primary Examiner—Georgia Y. Epps
Assistant Examiner—Robert Kim
Attorney, Agent, or Firm—Harvey Fendelman; Peter A. Lipovsky; Michael A. Kagan

[57] ABSTRACT

An interferometer employs liquid crystals to effect optical path length changes in a Michelson-type interferometer. A beam splitter divides a first optical signal into second and third optical signals. The second optical signal is directed through a first array of liquid crystals, and the third optical signal is directed through a second array of liquid crystals. Mirrors reflect the second and third optical signals back through the arrays to the beam splitter which combines them into a fourth optical signal having an interference pattern. A detector array transforms the fourth optical signal into an electrical signal. A processing circuit is used to modulate the indices of refraction of the liquid crystals to effectuate optical path length changes between the second and third optical signals. The data processor may also be employed to transform the electrical signal into digital data which may be analyzed to discern spectral characteristics of the first optical signal that are of interest.

34 Claims, 6 Drawing Sheets

LIQUID CRYSTAL INTERFEROMETER

The present invention relates to the field optical interferometry, and more, particularly to an interferometer which uses liquid crystals to achieve optical path length changes.

BACKGROUND OF THE INVENTION

Optical interferometry is a measurement technique that exploits the wave nature of light to produce extremely accurate measurements and provides excellent resolution without requiring any physical contact with the object being examined. Optical interferometry has been used to determine surface textures, shapes, distances, the speed of light through different media, and indices of refraction.

Optical interferometry is based on the phenomenon that two coherent light waves which are brought together (superimpose) behave similarly to water waves rippling through a pond. If the crest of one wave coincides with the crest of anther wave, the waves reinforce one another in what is referred to as constructive interference. If the crest of one wave coincides with the trough of another wave, the waves cancel each other out. This canceling process is referred to as destructive interference. Several wave disturbances arriving at a point simultaneously result in a disturbance that is the vector sum of each of the separate disturbances.

A Michelson interferometer is a well known device that uses interferometry to make extremely precise measurements. In a Michelson interferometer, a light signal is split into two optical beams. The first beam is used as a reference and traverses an optical path of fixed length. The second beam is directed along an optical path which may be varied. The divided beams are recombined to produce an output beam having an interference pattern. The optical path length may be lengthened or shortened to achieve a desired relation between the two divided beams.

One type of Michelson interferometer is described in U.S. Pat. No. 4,190,366. In the system described in the '366 patent, one of the optical path lengths is varied using a wedged-shaped optical element which can be oscillated to provide a correspondingly oscillating optical path length. One limitation of an oscillating wedge-shaped optical element is that the periodicity of the oscillations is limited by the inertial mass of the oscillating apparatus which not only includes the wedged-shaped optical apparatus, but also includes a motor and linkage for driving the optical element. Furthermore, precisely controlling the path length with a mechanical system is difficult with a mechanical apparatus. Such difficulty is especially problematic in applications where good repeatability is desired.

Thus, it may be appreciated that there is a need for an interferometric system in which the optical path lengths of the system may be varied with great precision, good repeatability, and at a frequency greater than that obtainable with mechanically based systems.

SUMMARY OF THE INVENTION

An interferometer employs liquid crystals to effect optical path length changes in a Michelson-type interferometer. A beam splitter divides a first optical signal into second and third optical signals. The second optical signal is directed through a first array of liquid crystals, and the third optical signal is directed through a second array of liquid crystals. Mirrors reflect the second and third optical signals back through the arrays to the beam splitter which combines them into a fourth optical signal having an interference pattern. A detector array transforms the fourth optical signal into an electrical signal. A processing circuit is used to modulate the indices of refraction of the liquid crystals to effectuate optical path length changes between the second and third optical signals. The data processor may also be employed to transform the electrical signal into digital data which may be analyzed to discern spectral characteristics of the first optical signal that are of interest.

An important advantage of the invention is that optical path length changes may be effectuated electrically, and at high frequencies without any mechanical part. A further advantage of the invention is that it provides a single interferometer which may be used as a fixed bandpass filter, tunable bandpass filter, and a Fourier transform spectrometer.

BRIEF DESCRIPTION OF THE FIGURES

Throughout the several figures, like referenced elements are referred to with like reference characters.

DESCRIPTION OF THE PREFERRED EMBODIMENTS

Figure 1A:
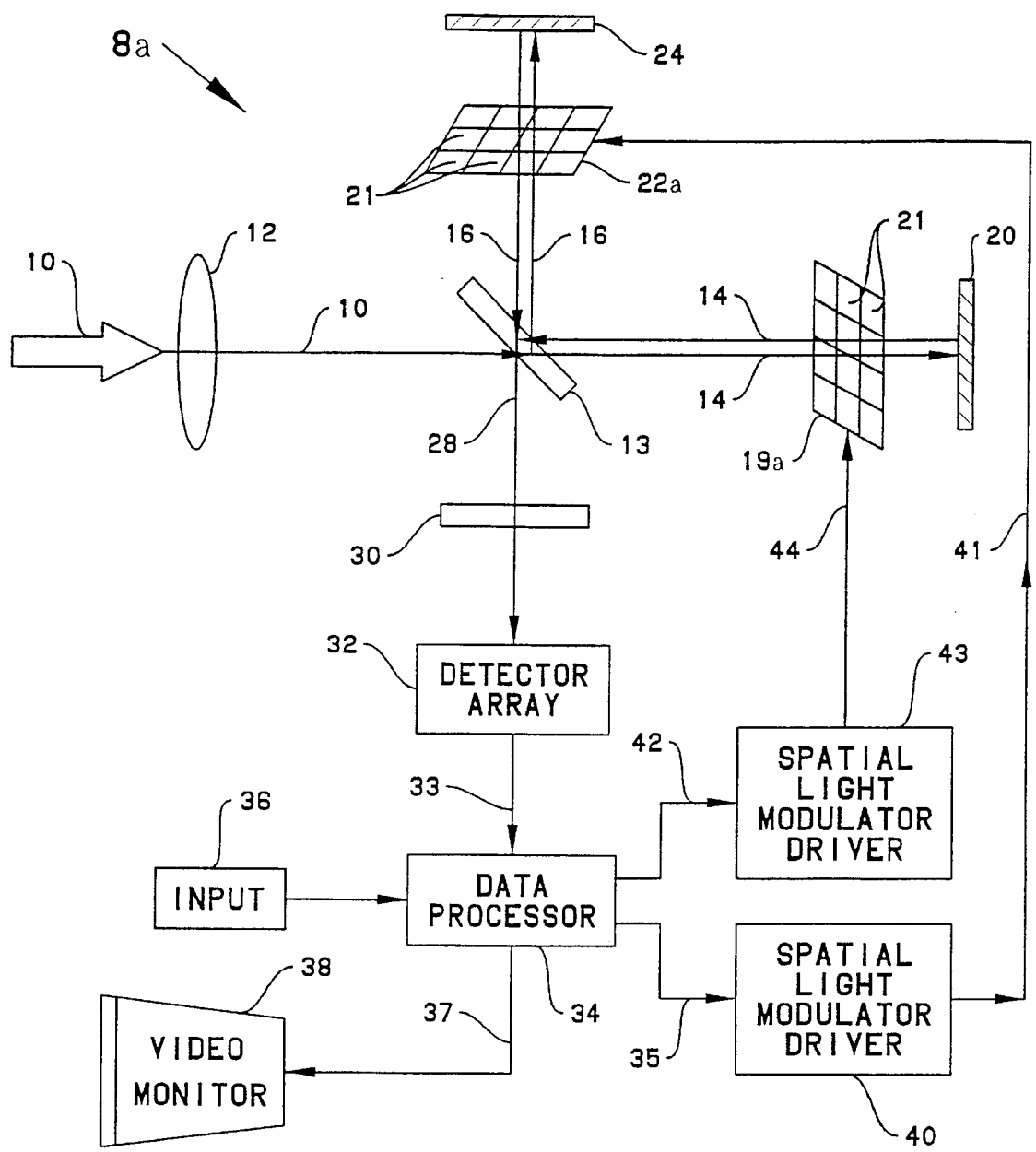
FIG. 1A shows a multi-liquid crystal interferometric filter embodying various features of the present invention.

The present invention provides an interferometer that incorporates liquid crystal arrays to obtain spectral information of a scene or image. Liquid crystal arrays allow changes to be made in the optical path lengths of the interferometer without any moving parts. The interferometer may be used in one mode as a Fourier transform spectrometer, or in another mode as a bandpass filter. Fourier transform spectrometers typically have a greater resolution than bandpass filters but require more data processing to perform a fast Fourier transform on an interferogram to obtain the desired spectrum.

When the interferometer is used as a bandpass filter, both the center wavelength and the bandpass performance characteristics of the invention may be selected through computer supervised control of the indices of refraction of liquid crystals configured into liquid crystal arrays. When operated in the bandpass mode, the invention may be used to detect an optical signal having a specific center wavelength or the invention may be tuned to through a spectral band.

Typical Fourier transform spectrometers measure the spectral content of a scene through interpretation of an interferogram. The interferogram is obtained by varying the length of one arm of a Michelson interferometer while keeping the second arm fixed. When the invention is operated as a Fourier transform spectrometer, optical path differences are achieved by modulating the indices of refraction of the liquid crystals in one arm of the interferometer while maintaining the indices of refraction of the liquid crystals in the second arm at a constant value. Such path modulation is equivalent to varying the physical length of one arm, but is accomplished with no moving parts.

An interferometer 8a embodying various features of the present invention is described with reference to FIG. 1A in which there is shown an optical signal 10, representing a scene, which is focused by optical lens 12 and directed to a beam splitter 13. The optical signal 10 is divided into optical signals 14 and 16 by beam splitter 13. Optical signal 14 is directed through liquid crystal array 19a, reflects off mirror 20, and propagates again through liquid crystal array 19a to beam splitter 13. Similarly, optical signal 16 is directed through liquid crystal array 22a, reflects off mirror 24, and again passes through liquid crystal array 22a to beam splitter 13. The beam splitter 13 combines optical signals 14 and 16 into optical signal 28 having an interference pattern. An interference pattern is defined as intensity variations of an optical signal resulting from the superposition of light fields having a phase relation between them. The interference pattern provided by optical signal 28 results from the difference in the optical path lengths of the optical signals 14 and 16. The liquid crystal arrays 19a and 22a may be selectively controlled as described below to modulate the optical path lengths of the optical signals 14 and 16, respectively.

Referring to FIG. 1A, optical signal 28 is directed through polarizer 30 and is imaged onto a detector array 32 such as a charge coupled device (CCD). By focusing the optical signal 10, lens 12 assures that optical signal 28, and hence the scene represented by optical signal 10, is properly imaged onto the detector array 32. Only one polarization of the optical signal 16 is effected by index changes of liquid crystal arrays 19a and 22a. Therefore, polarizer 30 is employed to block the polarization components of optical signal 16 unaffected by the liquid crystal arrays 19a and 22a. In response to receiving optical signal 28, the detector array 32 generates an electrical signal 33 representing the interference pattern of optical signal 28. The detector array includes an array of photodetectors (pixels), not shown, which transform optical signal 28 into electrical signal 33. Electrical signal 33 is really comprised of multiple signals associated with each photodetector of the detector array 32. An example of a detector arrays suitable for use in the present invention is EG&G Reticon Part No. RA0512J. The output signal 33 of detector array 32 is provided to data processor 34 which may be used to transform electrical signal 33 into digital data which may be processed using well known subroutines. For example, the data processor 43 may record an interferogram for each pixel of the detector array 32, generate data corresponding to intensity patterns of optical signal 28, and compare interference patterns in a series of optical signals 28. An output device such as video monitor 38 may be used to transform output signal 37 generated by data processor 32 into a visual representation of the interference pattern which characterizes optical signal 28.

The particular characteristics of the optical signal 10 which are desired to be examined or discerned depend on the particular application to which the interferometer 8a is tasked. For example, interferometer 8a may be operated as a fixed bandpass filter, a tunable bandpass filter, and as a Fourier transform spectrometer. Descriptions of the operating modes of the interferometer 8a are provided further herein.

The data processor 34 is also used to calibrate the liquid crystal arrays 19a and 22a. Generally, the optical path lengths of optical signals 14 and 16 are calibrated under the supervision of data processor 34 so that they are initially equal. In order to equilibrate the optical path lengths of optical signals 14 and 16, data processor 34 provides an output signal 42 to supervise spatial light modulator driver 43 which in turn generates voltage signals 44 that modulate the refractive index of each pixel, or individual liquid crystal 21 comprising the liquid crystal array 19a. Data processor 34 also provides output signals 35 to supervise spatial light modulator driver 40 which in turn generates output signals 41 to control the refractive index of the liquid crystals 21 comprising liquid crystal array 22a. The data processor 34 controls modulation of the refractive index of the liquid crystals 21 comprising liquid crystal arrays 19a and 22a until the voltage signal 33 output by detector array 32 is maximized. An important feature of the invention is that the data processor 34 may be suitably programmed to control the modulation of the index of refraction of each liquid crystal 21 comprising liquid crystal arrays 19a and 22a at high frequency and over a broad range.

Spatial light modulator drivers are well known. For example, Meadowlark Optics manufactures one type of spatial light modulator driver, identified as Part Number ILV-SLM1070. The liquid crystal arrays 19a and 22a may be implemented using liquid crystal formulations such as BDH Chemicals No. E44. The data processor 34 may implement commercially available software, such as available from Meadowlark Optics, to effectuate appropriate modulation of the liquid crystals 21 comprising the liquid crystal arrays 19a and 22a. An input device 36, such as a standard computer keyboard, may be operably coupled to data processor 34 to facilitate supervisory control by a human operator over the operation of data processor 34.

Figure 2:
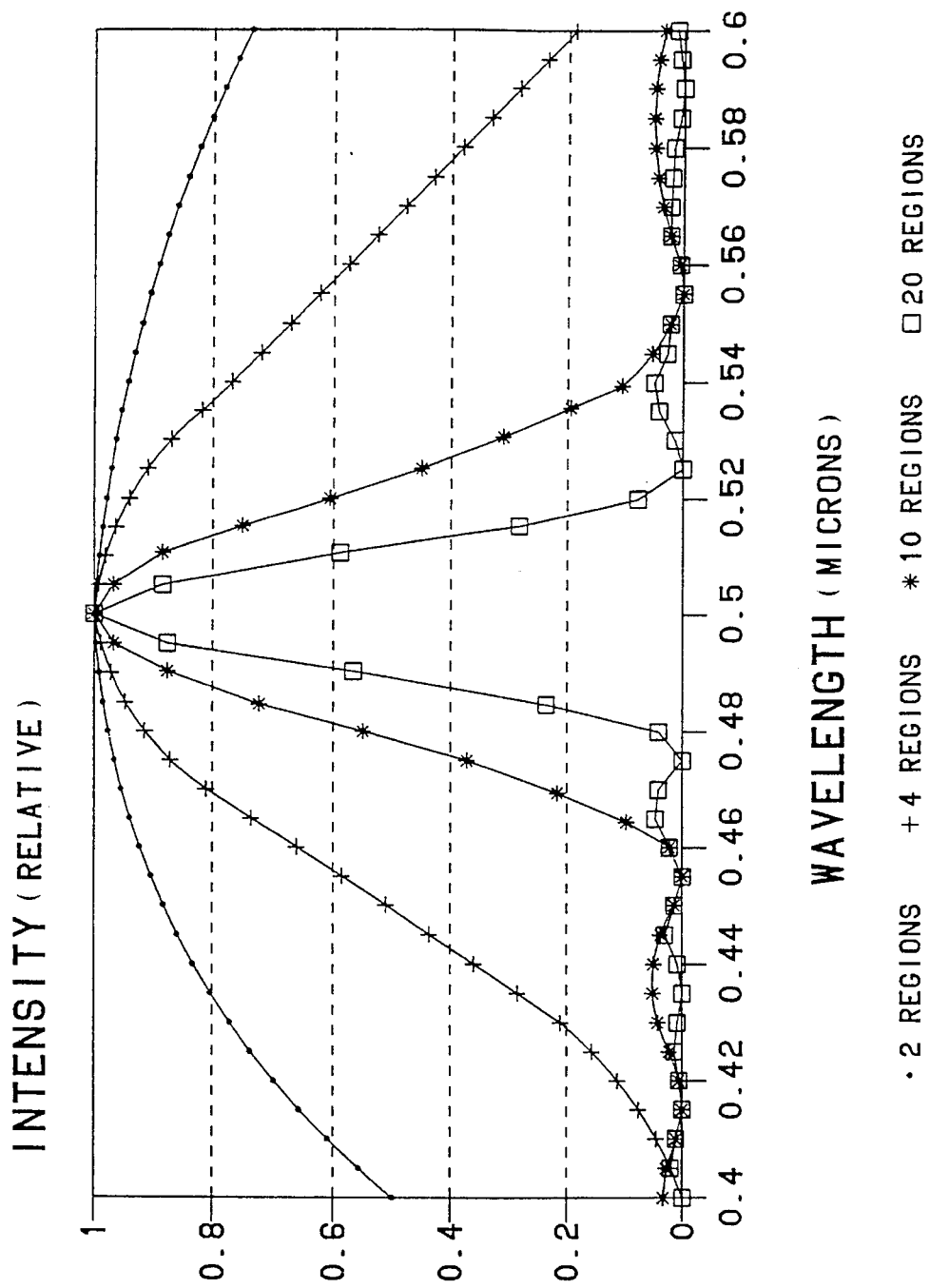
FIG. 2 is a graph illustrating the performance of the present invention as an optical band pass filter.

Interferometer 8a may be operated as a band pass filter to determine if optical signal 10 has a particular optical component having some specific center wavelength, as for example, 0.5 microns. This type of application is analogous to placing a colored filter in front of the lens of a camera. In such application, a human operator directs the computer 34 to establish specific indices of refraction for the liquid crystals 21 of the liquid crystal array 22a. FIG. 2 shows a plot of the relative intensities of optical signals having a center wavelength of about 0.5 microns as a function of wavelength in an application in which the interferometer 8a is used as a bandpass filter. FIG. 2 shows that the of interferometer 8a bandpass increases as the number of regions decreases. The term "regions" refers to groups of one or more liquid crystals 21 all having the same index of refraction.

Figure 3:
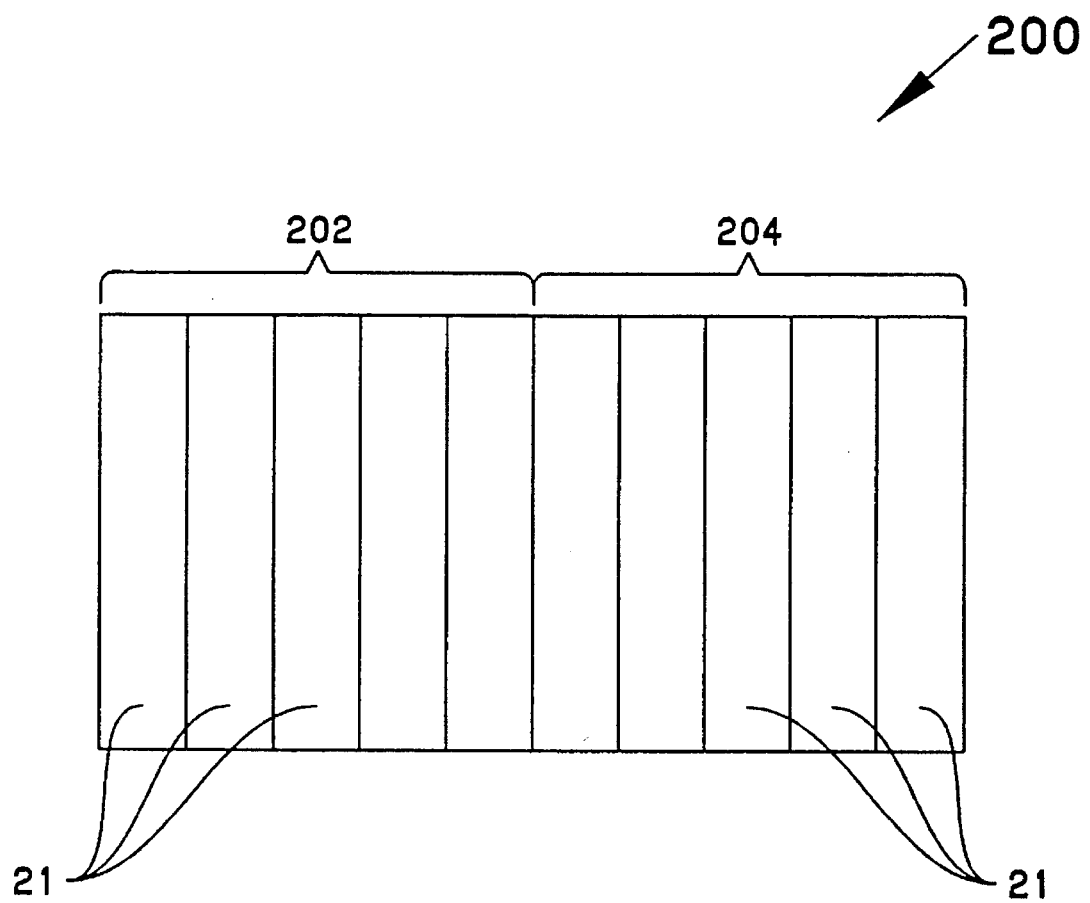
FIG. 3 shows a liquid crystal array divided into regions.

FIG. 3 shows, by way of example, a 10×1 liquid crystal array 200 comprising a single row of (10) liquid crystals 21. The array 200 may be divided into (2) regions 202 and 204 each comprised of (5) liquid crystals 21. In a "two region interferometer," all of the liquid crystals 21 comprising the region 202 would be controlled to have an index of refraction $n_1$, and the region 202 would be controlled by the data processor 34 acting through spatial light modulator driver 40 to have an index of refraction $n_2$, where $n_1 \neq n_2$. However, it is to be understood that the scope of the invention includes liquid crystal arrays having other numbers of liquid crystals than the one described with reference to FIG. 3. For example, the liquid crystal arrays 19a and 22a may be P×Q arrays, where P and Q are positive integers.

In an application where the liquid crystal array 22a has 20 regions, then the maximum band pass for an optical signal having a center wavelength of 0.5 microns is on the order of about 0.48 to 0.52 microns. However, if the liquid crystal array 22a is divided into 10 sets of one or more liquid crystals 21, the maximum band pass for an optical signal having a wavelength of 0.5 microns is on the order of about 0.46 to 0.54 microns. The operator may obtain the bandpass performance required for a particular application by selecting the number of regions into which the array 22a is divided.

Interferometer 8, shown in FIG. 1, may be referred to as a "double pass" interferometer because optical signals 14 and 16 pass twice through liquid crystal arrays 19a and 22a, respectively. Therefore, in an application in which interferometer 8a is configured as a four region interferometer to detect an optical signal having a specific wavelength of 0.5 microns, the difference between the optical paths of the signals 14 and 16 may be set equal to half integer multiples of 0.5 microns; i.e.

(1/2)(0.5 microns)=0.25 microns;

(2/2)(0.5 microns)=0.5 microns;

(3/2)(0.5 microns)=0.75 microns; and (4/2)(0.5 microns)=1.0 micron.

The interferometer 8a may also be used to perform fast Fourier transform spectroscopy (FTS). In an FTS application the objective is to obtain an interferogram of the scene represented by optical signal 10 imaged onto detector array 32. This may be accomplished using interferometer 8a by varying the optical path length of signal 16 while holding the optical path length of optical signal 14 constant. The value of the path length difference resulting from each pixel of the detector array 32 is recorded by the data processor 34 to provide an intensity sequence, known as an interferogram. The path length differences are created by changing the index of refraction of the liquid crystal array 22a. However, the index of refraction for all of the liquid crystals of the liquid crystal array 22a are controlled to be the same at any one time. By varying the index of refraction of the liquid crystals 21 (in either liquid crystal arrays 19a or 22a) in small increments, detecting the resulting intensity pattern on detector array 32, and recording the pattern by data processor 34, an interferogram can be obtained. Since optical signal 10 is imaged by optical lens 12 onto array 32, a unique interferogram is obtained for each pixel comprising the detector array 32. The interferogram for each pixel then is subjected to a fast Fourier transform performed on the interferogram to obtain the spectral content of the optical signal 28 imaged into each pixel of the detector array 32. The interferograms for each pixel of the scene can be directly compared to identify or detect objects with unique spectral signatures.

The resolution (in wave numbers) of interferometer 8a when operated in a Fourier transform spectrometer mode is equal to 1/L where L is the maximum path length difference between the optical signals 14 and 16. In terms of the wavelength, the resolution is equal to $W^2/L$ where W is the wavelength. Since interferometer 8a provides a double pass configuration, as described above, the maximum optical path length difference between the optical signals 14 and 16 is given by 2ND, where N is the birefringence of the liquid crystal array 22a and D is the thickness of the liquid crystal. The birefringence of liquid crystals vary, but a birefringence where N=0.2 is reasonable to assume for this example. For example, BDH Chemicals formula No. E44 has a birefringent value of 0.262. The path length difference for a 50 micron thick liquid crystal is then 2(0.2) 50 microns equals 20 microns. For a wavelength of 3 microns, this would result in a resolution of 0.9 microns. For a wavelength of 0.5 microns a resolution is 0.0125 microns or 12.5 nanometers.

More specifically, in the operation of interferometer 8a as a Fourier transform spectrometer, one may vary the path length difference between the optical signals 14 and 16 in fixed increments, S, where S=2MD, and where M is a small change, as for example, M=0.01, in the index of refraction of the liquid crystals of the liquid crystal array 22a. If M is chosen to be equal to 1/20 of the assumed birefringence value of 0.2, then S=2(0.01)50 microns, or 1 micron. The optical path lengths of optical signals 14 and 16 are initially calibrated so as to be equal using data processor 34. The values of each pixel of the detector array 32 are preferably recorded by data processor 34. The optical path length of signal 16 is modulated under supervisory control of the data processor 34 which implements changes in the index of refraction of all the liquid crystals comprising the liquid crystal array 21 by 0.01, thereby providing a path length difference of 1 micron between the optical signals 14 and 16. The output values of the detector array 32 are recorded. The liquid crystal values may be recorded by the data processor 34. The index of refraction of each liquid crystal 21 is modulated by another 0.01 increment to give a total path length difference of 2 microns. The pixel values of the detector array 32 are preferably recorded by data processor 34 and the process is repeated until the entire 20 micron path length difference has been obtained.

Figure 1B:
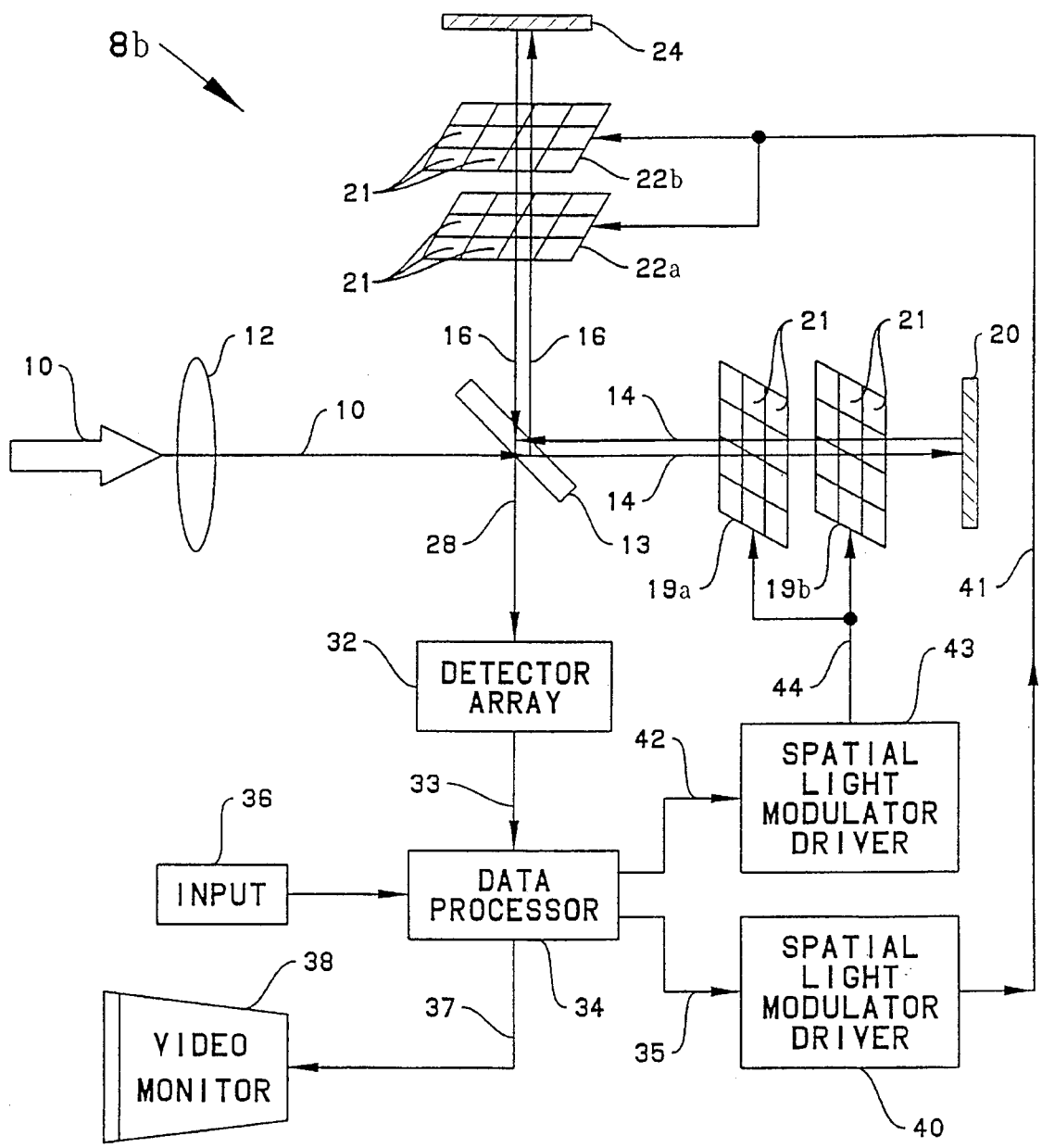
FIG. 1B shows another embodiment of the multi-liquid crystal interferometric filter of FIG. 1.

Another embodiment of the present invention is shown in FIG. 1B where the interferometer 8b is shown to include liquid crystal arrays 19a and 19b through which the optical signal 14 is directed. The liquid crystal arrays 19a and 19b are oriented to produce phase changes in orthogonal polarization components comprising optical signal 16. Similarly, liquid crystal arrays 22a and 22b are positioned so that the optical signal 16 passes through each of them, reflects off mirror 24 and then is directed back through the arrays 22a and 22b. The liquid crystal arrays 22a and 22b are also oriented to produce phase changes in orthogonal polarization components comprising optical signal 14. The optical signals 14 and 16 are combined by the beam splitter 13 to form optical signal 28, characterized by an interference pattern, which is provided to the detector array 32. Interferometer 8b requires no polarizer between the beam splitter and the detector array 32 because the combination of liquid crystal arrays 19a and 19b and of liquid crystal arrays 22a and 22b will affect all the polarization components of the optical signals 16 and 14. The refractive indices of the individual liquid crystals 21 of liquid crystal arrays 19a and 19b are modulated by signal 44. Likewise, the refractive indices of the individual liquid crystals 21 of the liquid crystal arrays 22a and 22b may be modulated by signal 41. Except for the use of two liquid crystal arrays in each arm through which the signals 14 and 16 are directed, the operation of interferometer 8b is otherwise identical to the operation of interferometer 8a.

Figure 5:
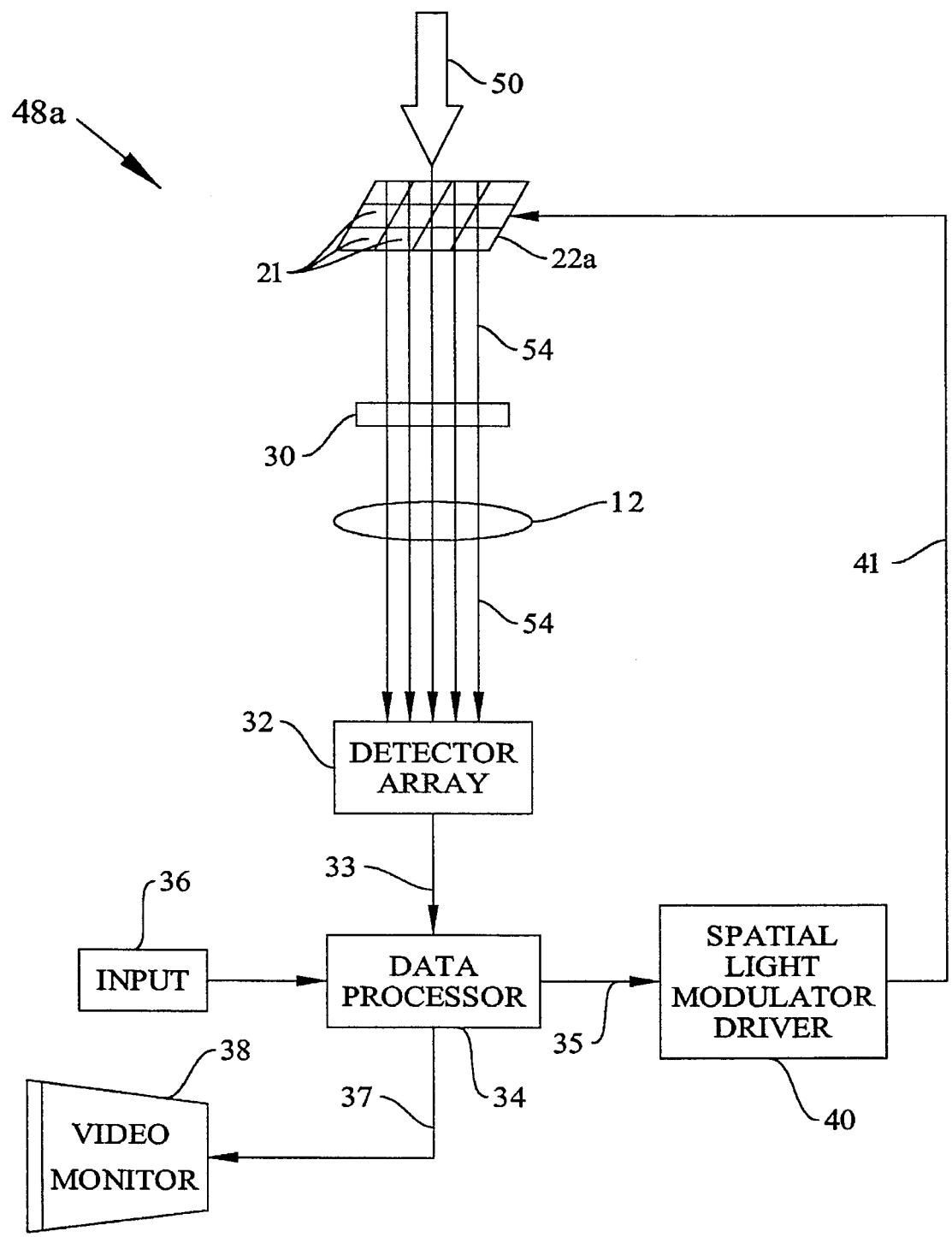
FIG. 5 shows a single pass embodiment of the present invention having one liquid crystal array.

Referring to FIG. 5, there is shown a single pass embodiment of an interferometer 48a embodying various features of the present invention which may be used as a Fourier transform spectrometer or as a bandpass filter. The phrase "single pass" refers to the fact that the optical signal 50 passes through the liquid crystal array 22a only once. Thus, total path length differences are only 1/2 of the path length differences obtained in the interferometers 8a and 8b shown in FIGS. 1A and 1B. Optical signal 50, representing the image of a scene, is directed through liquid crystal array 22a to result in an optical signal 54 which is characterized by an interference pattern. The optical signal 54 is directed to lens 12 which focuses optical signals 54 on detector array 32. The output signals 33 of detector array 32 are electrical analogues of the optical signals 54. Signal 33 is provided to data processor 34 which preferably analyzes the electrical signal 33 using well known techniques to perform a fast Fourier transform on the digital representation of the electrical signal 33 to obtain the desired spectrum. The data processor 34 may be employed to provide output signals to video monitor 38 which displays information revealing the characteristics of the optical signals 50 desired to be examined. The data processor 34 also supervises spatial light modulator driver 40 via signals 35. Spatial light modulator 40 in turn generates signals 41 which control the indices of refraction of each liquid crystal of liquid crystal array 22a.

The interferometer 48a may be used as a band pass filter to look for a specific spectral component of optical signal 50, as for example, a component having a wavelength of 0.5 microns. The interferometer 48a then is configured using data processor 34 so that the liquid crystal array 22a is divided into an appropriate number of regions, where each region is comprised of a number of liquid crystals 21 each having a predetermined index of refraction, as described above. The number of regions into which the liquid array 22a is divided determines the bandpass of the interferometer 48. Since interferometer 48a provides a single pass configuration to optical signals 50, i.e. light passes through liquid crystal array 22a only once, the path length differences are set equal to integer multiples of 0.5 microns, i.e. 0.5 microns, 1.0 microns, 1.5 microns, and 2.0 microns where it is desired for liquid crystal array 22a to be divided into four regions, where each region is comprised of one or more liquid crystals are controlled to have a specific index of refraction.

Still referring to FIG. 5, in applications where interferometer 48a is used as a Fourier transform spectrometer, liquid crystal array 22a may be, for example, divided into two equal areas comprised of liquid crystals 21. The indices of refraction of the liquid crystals 21 in one half of the array 22a remains constant (upper half of array 22a for example) while the liquid crystals 21 in the other half of liquid crystal array 22a (lower half of array 22a) is varied to produce variable path lengths. Since optical signal 54 is imaged onto detector array 32, the output signal 33 includes an interference pattern for each pixel of the detector array.

Figure 6:
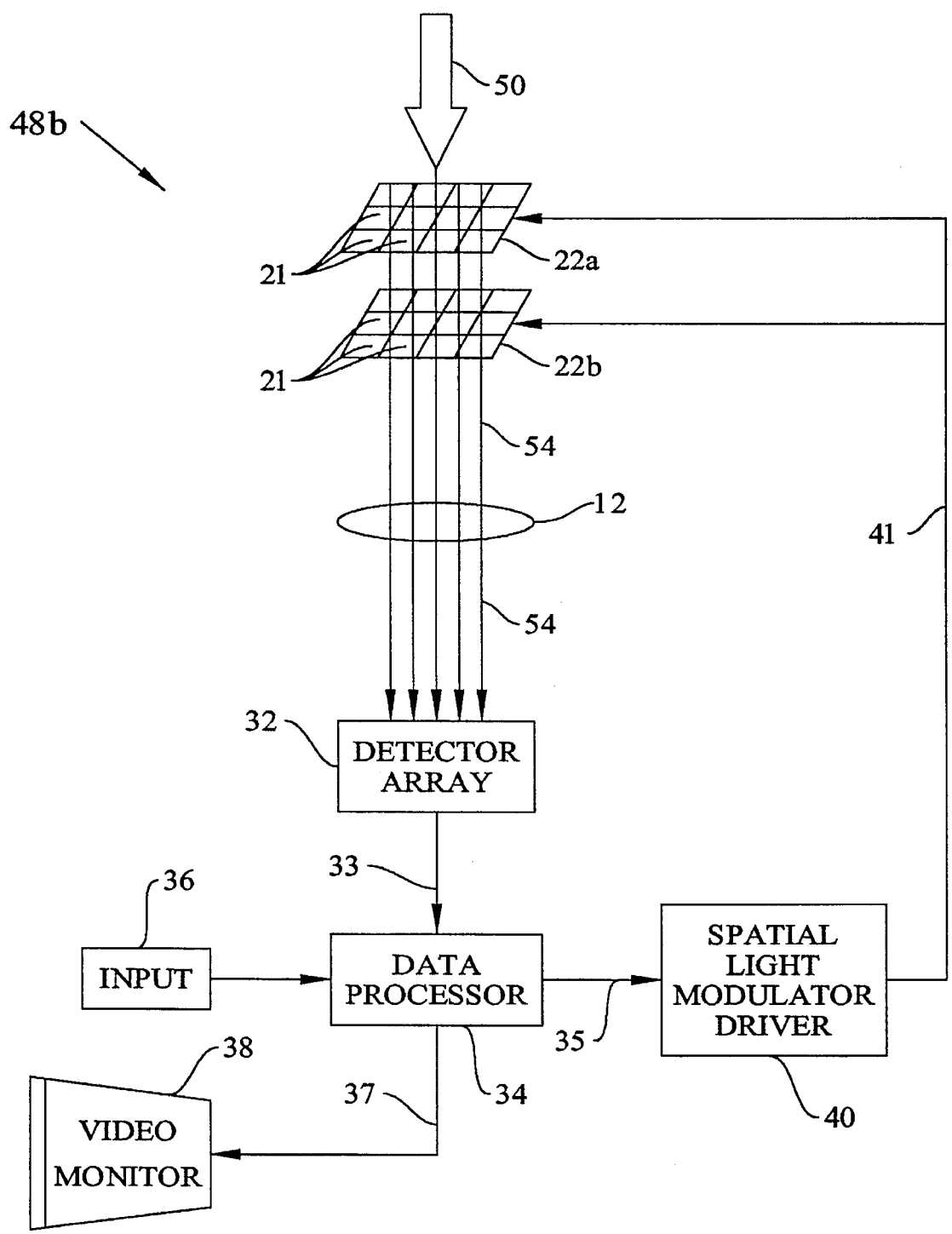
FIG. 6 shows a single pass embodiment of the invention having two liquid crystal arrays.

Referring to FIG. 6, there is shown a single pass interferometer 48b embodying various features of the present invention. Interferometer 48b is similar in construction to interferometer 48a except that: (1) the optical signal 50 is directed through two liquid crystal arrays 22a and 22b, and (2) no polarizer is required. The liquid crystal arrays 22a and 22b are oriented to produce phase changes in orthogonal polarization components comprising optical signal 50. Therefore, interferometer 48b does not require a polarizer. The operation of interferometer 48b is otherwise identical to the operation of interferometer 48a, described above.

While the present invention has been described in terms of preferred embodiments, it is to be understood that the invention is not to be limited to the exact form of the apparatus or processes disclosed. For example, the interferometers 8a and 8b may be constructed so that the mirrors 20 and 24 direct the optical signals 14 and 16 directly to the beam splitter 13 without causing them to pass again through the liquid crystal arrays 19a and 22a, or through 19 and 19b, and through 22a and 22b. Therefore, it is to be understood that the invention may be practices other than as specifically described without departing from the scope of the claims.

I claim:

1. An interferometer, comprising:

a beam splitter for dividing a first optical signal into second and third optical signals;

a first array of liquid crystals through which said second optical signal passes, each said liquid crystal having an index of refraction which may be modulated;

a first mirror for directing said second optical signal array to said beam splitter;

a second array of liquid crystals through which said third optical signal passes, each said liquid crystal having an index of refraction which may be modulated;

a second mirror for directing said third optical signal to said beam splitter where said second and third optical signals are combined to form a fourth optical signal having an interference pattern;

a detector array for transforming said fourth optical signal into an electrical signal; and first means for transforming said electrical signal into digital data representing said interference pattern and for independently modulating said indices of refraction of said liquid crystals comprising said first and second arrays of liquid crystals.

2. The interferometer of claim 1 wherein said first means transforms said electrical signal into digital data representing said interference pattern.

3. The interferometer of claim 1 wherein said first means includes:

a data processor coupled to receive said electrical signal from said detector array;

a first spatial light modulator driver operably coupled between said data processor and said first array of liquid crystals; and a second spatial light modulator driver operably coupled between said data processor and said second array of liquid crystals.

4. The interferometer of claim 1 further including a polarizer through which said fourth optical signal is directed.

5. The interferometer of claim 1 further including a third array of liquid crystals through which said second optical signal is directed.

6. The interferometer of claim 1 further including a fourth array of liquid crystals through which said third optical signal is directed.

7. The interferometer of claim 1 wherein each of said liquid crystals of said first array of liquid crystals have substantially the same index of refraction.

8. The interferometer of claim 1 wherein said liquid crystals of said first array of liquid crystals are grouped into multiple sets of said liquid crystals, and all of said liquid crystals comprising any one of said sets have substantially the same index of refraction.

9. The interferometer of claim 1 further including a lens for directing said first optical signal to said beam splitter and for imaging a scene onto said detector array.

10. An interferometer, comprising:

an array of liquid crystals for transforming a first optical signal into a second optical signal having an interference pattern, each said liquid crystal having an index of refraction which may be modulated;

an array detector for transforming said second optical signal into an electrical signal;

lens for focusing said second optical signal onto said array detector; and first means for independently modulating said indices of refraction of said liquid crystals.

11. The interferometer of claim 10 wherein said first means transforms said electrical signal into data representing said interference pattern.

12. The interferometer of claim 10 wherein said first means includes an array detector.

13. The interferometer of claim 10 wherein said first means includes a data processor.

14. The interferometer of claim 13 wherein said first means includes:

a spatial light modulator driver operably coupled between said data processor and said array of liquid crystals.

15. The interferometer of claim 10 wherein said liquid crystals of said array of liquid crystals are grouped into multiple sets of said liquid crystals, and all of said liquid crystals comprising any one of said sets have substantially the same index of refraction.

16. The interferometer of claim 10 wherein each of said liquid crystals of said array of liquid crystals have substantially the same index of refraction.

17. The interferometer of claim 10 further including a polarizer for polarizing said second optical signal.

18. A method for generating an interference pattern, comprising the steps of:

dividing a first optical signal into second and third optical signals;

directing said second optical signal through a first array of liquid crystals, each of said liquid crystals having an index of refraction;

directing said third optical signal through a second array of liquid crystals, each of said liquid crystals having an index of refraction;

independently modulating said indices of refraction of said liquid crystals comprising said first and second arrays;

combining said second and third optical signals into a fourth optical signal having a waveform characterized by an interference pattern; and transforming said fourth optical signal into an electrical signal having a waveform representing said interference pattern.

19. The method of claim 18 further including the step of transforming said electrical signal into digital data.

20. The method of claim 18 further including the step of modulating said indices of refraction of said liquid crystals of said first array to be substantially equal.

21. The method of claim 18 further including the step of modulating said indices of refraction of said liquid crystals whereby groups of said liquid crystals of said first array are comprised of liquid crystals having substantially the same index of refraction.

22. The method of claim 18 further including the step of polarizing said fourth optical signal.

23. A method for generating an interference pattern, comprising the steps of:

directing a first optical signal through a first array of liquid crystals to transform said first optical signal into a second optical signal having an interference pattern, each of said liquid crystals having an index of refraction;

independently modulating said indices of refraction of said liquid crystals; and transforming said second optical signal into an electrical signal having a waveform representing said interference pattern.

24. The method of claim 23 further including the step of transforming said electrical signal into digital data.

25. The method of claim 23 further including the step of modulating said indices of refraction of said liquid crystals of said first array to be substantially equal.

26. The method of claim 23 further including the step of modulating said indices of refraction of said liquid crystals whereby groups of said liquid crystals of said first array are comprised of said liquid crystals each having substantially the same said index of refraction.

27. The method of claim 23 further including the step of polarizing said first optical signal.

28. The method of claim 23 further including the step of polarizing said second optical signal.

29. An interferometer, comprising:

a beam splitter for dividing a first optical signal into second and third optical signals;

first and second groups of liquid crystals configured into a first array for modulating the optical path length of said first optical signal, each said liquid crystal having an index of refraction which may be modulated;

a first mirror for directing said second optical signal array to said beam splitter;

a third group of liquid crystals configured into a second array for modulating the optical path length of said second optical signal, each said liquid crystal having an index of refraction which may be modulated;

a second mirror for directing said third optical signal to said beam splitter where said second and third optical signals are combined to form a fourth optical signal having an interference pattern;

a detector array for transforming said fourth optical signal into an electrical signal; and first means for transforming said electrical signal into digital data representing said interference pattern, and for modulating said indices of refraction of said liquid crystals comprising said first group to have a first value, and for modulating said indices of refraction of said liquid crystals comprising said second group to have a second value.

30. The interferometer of claim 29 in which said indices of refraction of said liquid crystals comprising said first group have a first value, and said liquid crystals comprising said second group have a second value different from said first value.

31. The interferometer of claim 29 in which said indices of refraction of said liquid crystals comprising said first group and said liquid crystals comprising said second group all have the same value.

32. A method for generating an interference pattern, comprising the steps of:

directing a first optical signal through first and second groups of liquid crystals to transform said first optical signal into a second optical signal having an interference pattern, each of said liquid crystals having an index of refraction;

modulating said indices of refraction of said liquid crystals comprising said first and second groups of liquid crystals; and transforming said second optical signal into an electrical signal having a waveform representing said interference pattern.

33. The method of claim 32 wherein said indices of refraction of said liquid crystals comprising said first group of liquid crystals each have a first value, and said liquid crystals comprising said second group of liquid crystals each have a second value different from said first value.

34. The method of claim 32 wherein said indices of refraction of said liquid crystals comprising said first group of liquid crystals each have a first value, and said liquid crystals comprising said second group of liquid crystals each have a second value equal to said first value.

* * * * *